United States Patent [19]

Lehman

[11] 4,296,984

[45] * Oct. 27, 1981

[54] CABINET STORAGE CONVEYOR

[75] Inventor: John C. Lehman, Marietta, Pa.

[73] Assignee: John C. Lehman, Inc., Lancaster, Pa.

[*] Notice: The portion of the term of this patent subsequent to Mar. 4, 1997, has been disclaimed.

[21] Appl. No.: 91,392

[22] Filed: Nov. 6, 1979

Related U.S. Application Data

[63] Continuation-in-part of Ser. No. 883,294, Mar. 3, 1978.

[51] Int. Cl.³ .................... B65G 1/12; A47B 49/00
[52] U.S. Cl. .................... 312/268; 312/97; 312/134; 198/799
[58] Field of Search ............ 312/266, 267, 268, 291, 312/134, 223, 97, 97.1; 198/799

[56] References Cited

U.S. PATENT DOCUMENTS

| | | | |
|---|---|---|---|
| 629,704 | 7/1899 | Symes | 312/134 |
| 1,072,007 | 9/1913 | Hick | 312/268 |
| 1,250,125 | 12/1917 | Baker et al. | 198/799 |
| 1,269,414 | 6/1918 | Fittering | 312/134 |
| 1,542,817 | 6/1925 | Bernheim | 312/134 |
| 2,138,190 | 11/1938 | Myers | 312/291 |
| 2,745,706 | 5/1956 | Mendelsohn | 312/268 |
| 2,905,517 | 9/1959 | Mead | 312/268 |
| 2,936,722 | 5/1960 | Skarin | 312/268 |
| 3,515,257 | 6/1970 | Smith et al. | 198/799 |
| 3,589,785 | 6/1971 | Appleby | 312/268 |
| 3,720,451 | 3/1973 | Anders | 312/268 |
| 4,017,132 | 4/1977 | Banys | 312/268 |
| 4,037,715 | 7/1977 | Onishi et al. | 198/799 |

FOREIGN PATENT DOCUMENTS

| | | | |
|---|---|---|---|
| 128516 | 1/1932 | Austria | 312/134 |
| 523159 | 3/1956 | Canada | 312/268 |
| 677732 | 12/1964 | Italy | 312/266 |

*Primary Examiner*—Victor N. Sakran
*Attorney, Agent, or Firm*—Brady, O'Boyle & Gates

[57] ABSTRACT

To greatly increase the storage capacity of cabinets and to efficiently utilize the corner space in such cabinets and to render frequently-used stored articles more readily accessible, a prefabricated modular or unitized storage conveyor apparatus is installed with only minor modification of existing or newly manufactured cabinets. Adjacent building space customarily wasted can receive portions of the storage conveyor unit. Simplicity, economy of manufacturing, and reliability of operation are featured in the conveyor mechanism.

7 Claims, 10 Drawing Figures

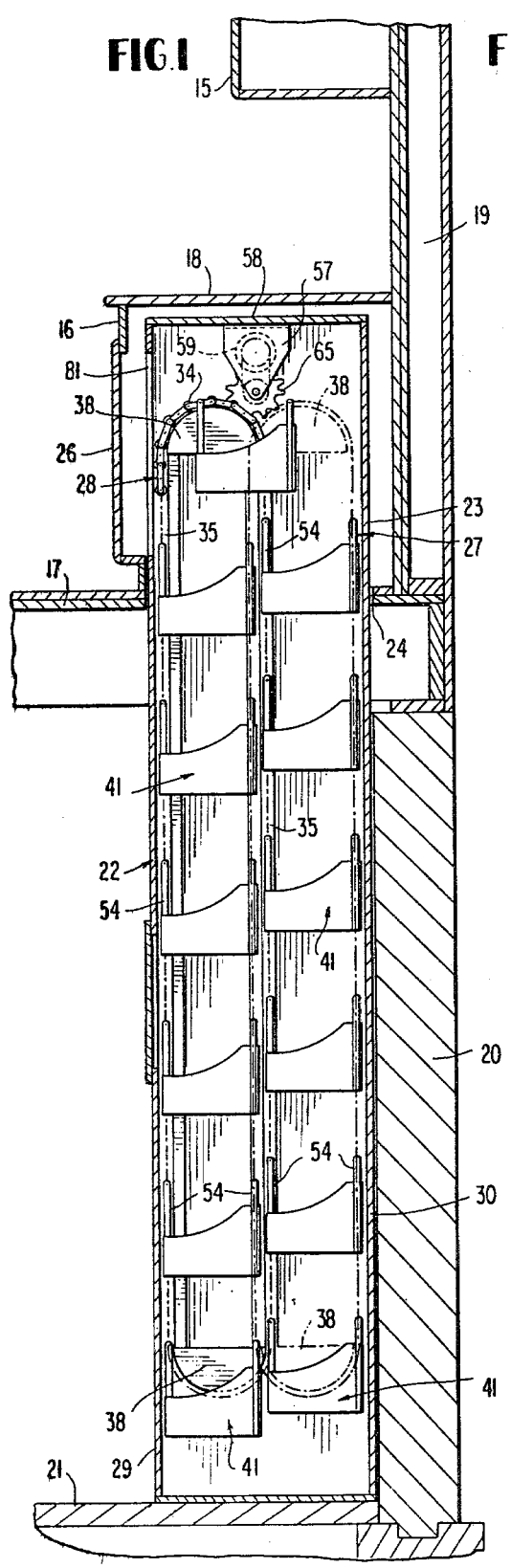
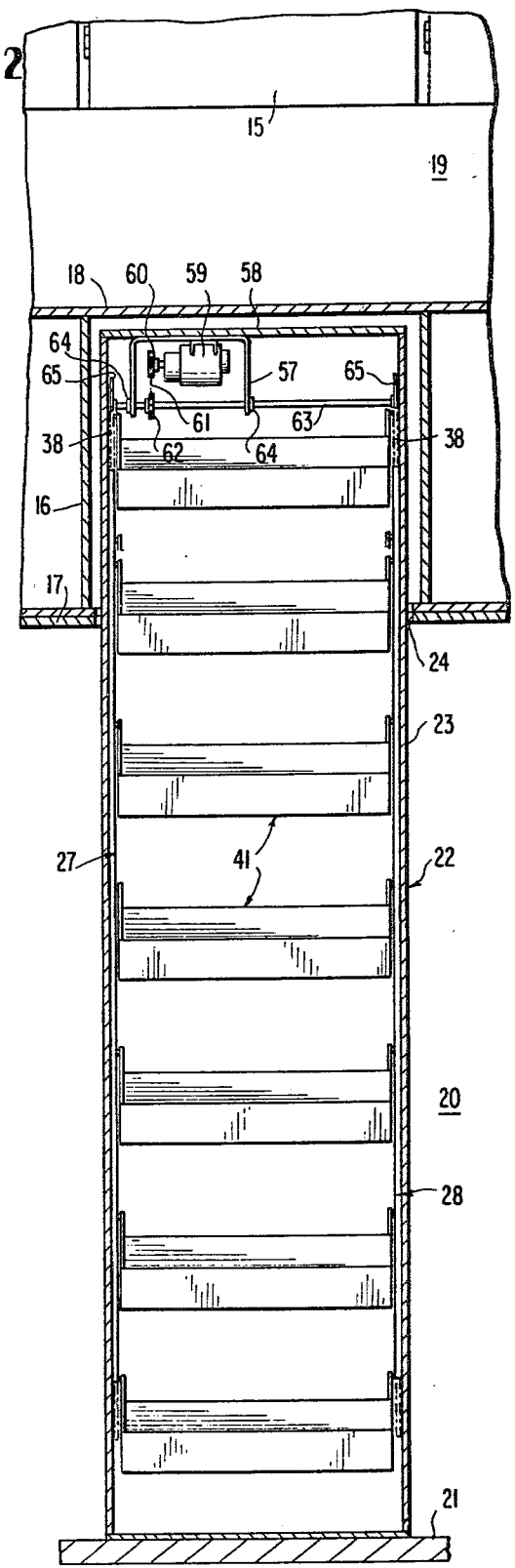

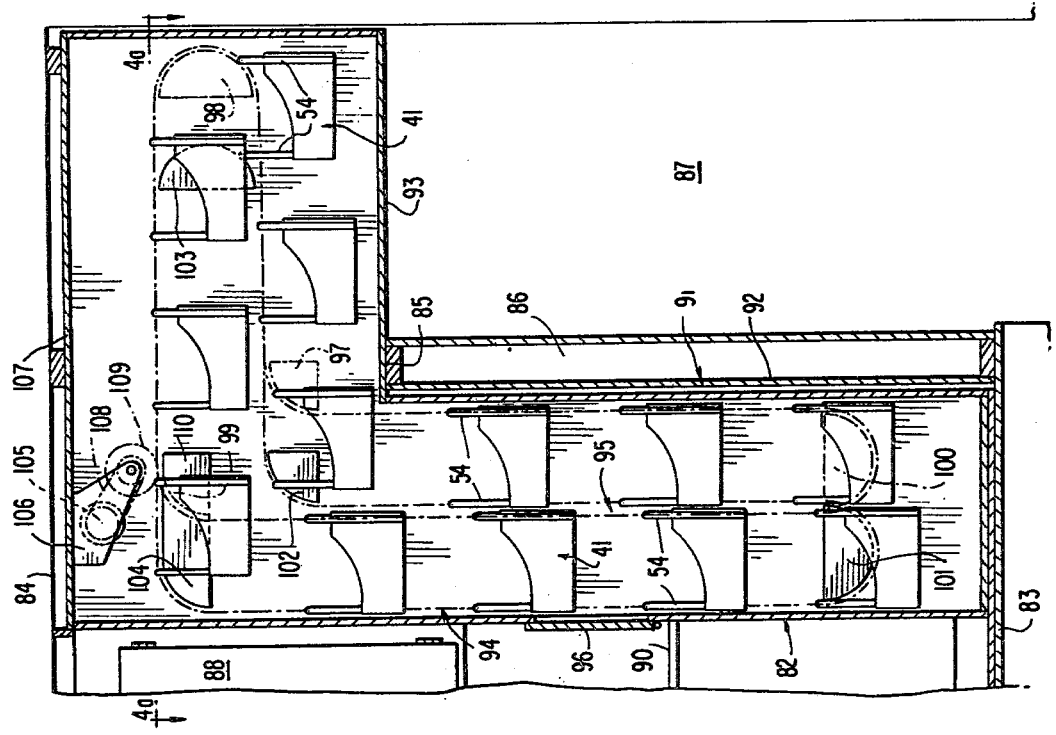
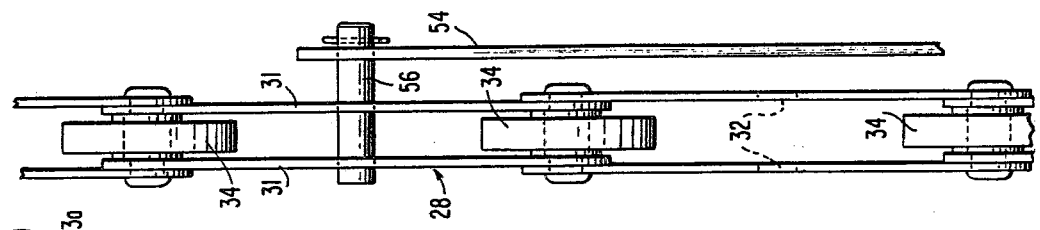
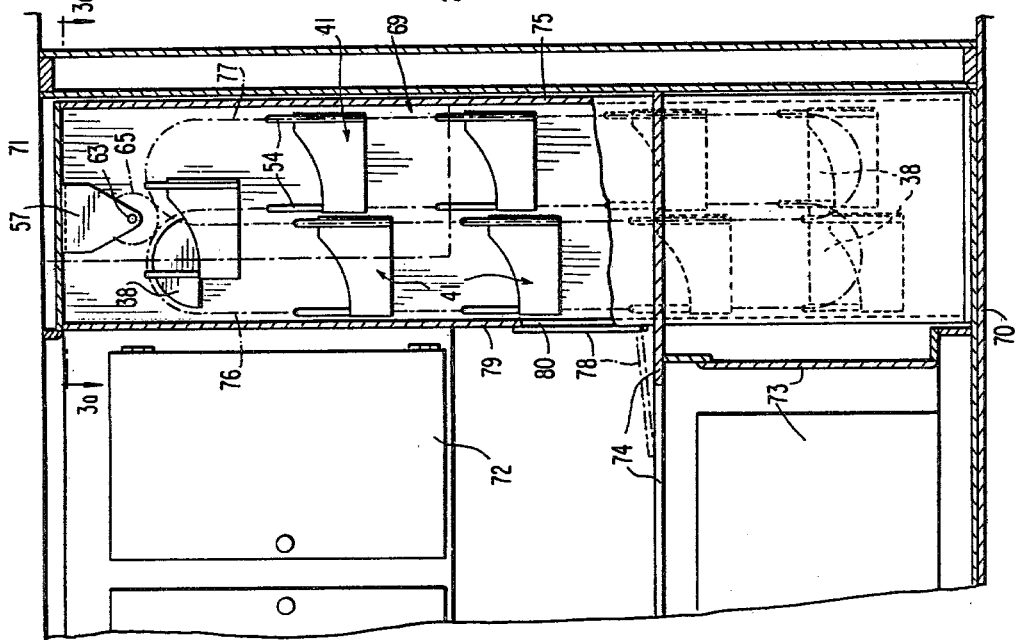

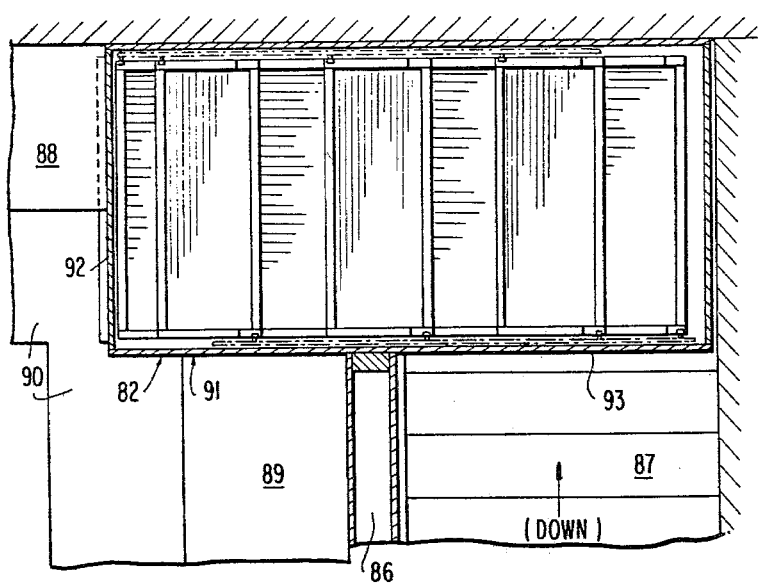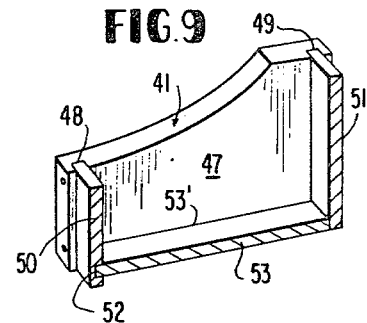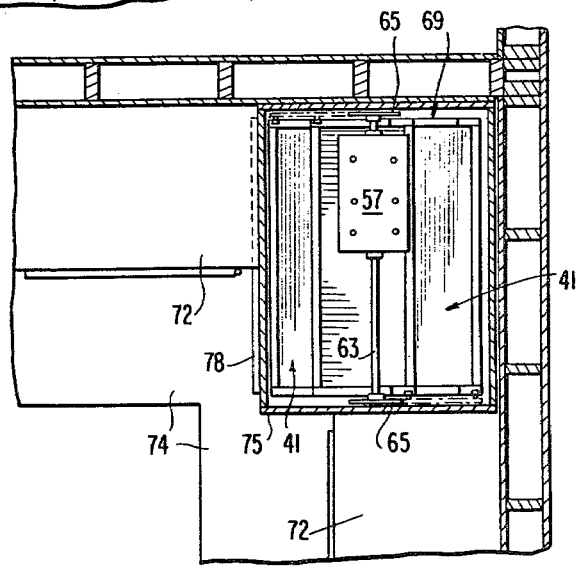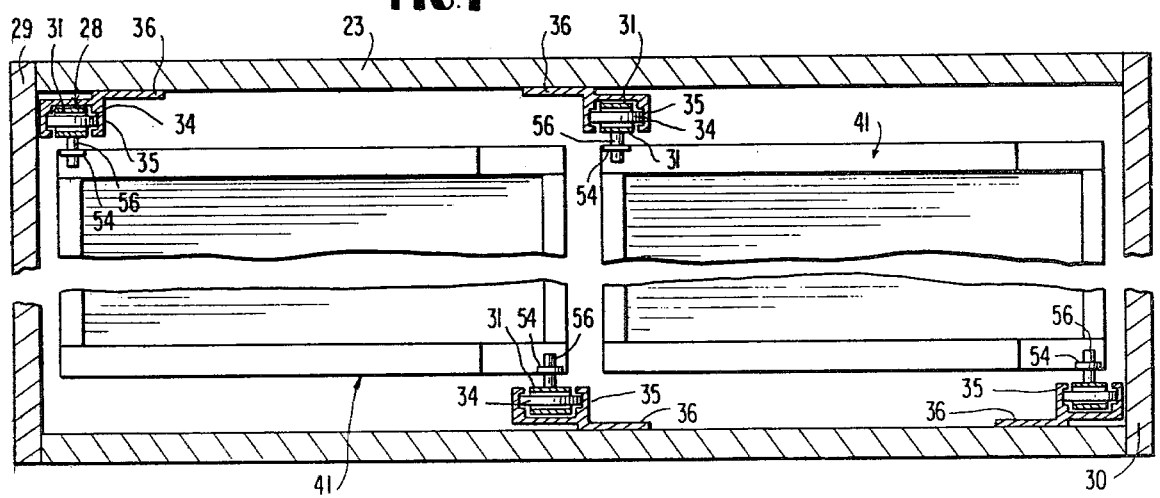

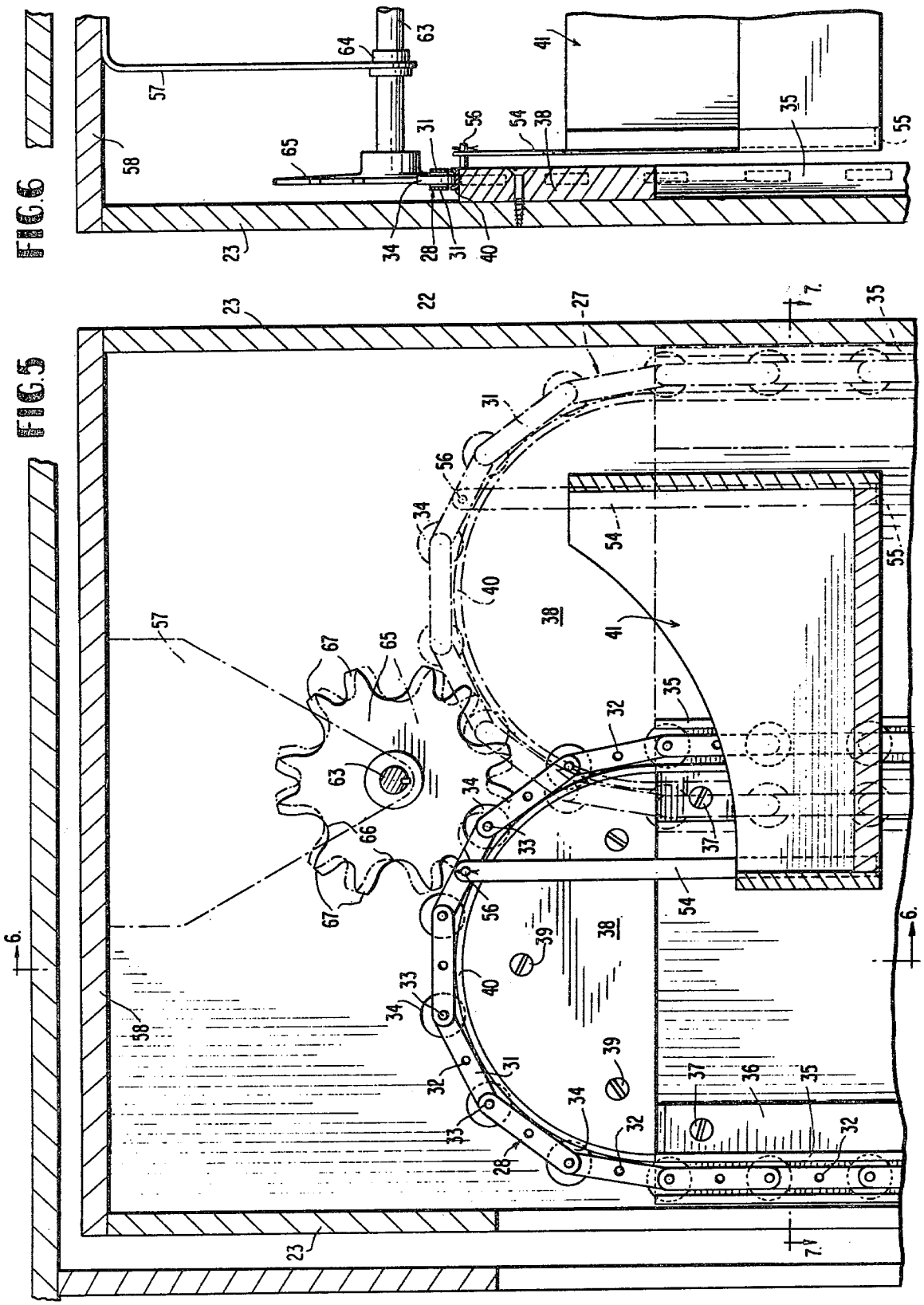

CABINET STORAGE CONVEYOR

CROSS-REFERENCE TO RELATED APPLICATION

This application is a continuation-in-part of my copending application Ser. No. 883,294, filed Mar. 3, 1978.

Various conveyor systems for a wide variety of goods including elevating conveyors, horizontal conveyors, and combination types, are known in the prior art. The so-called "dumb waiter" for elevating various articles in the homes, restaurants and the like between different floor levels has long been known in the art.

The present invention has for its major objective to satisfy a particular need of the art which has heretofore not been satisfied, and which known prior art devices are not readily capable of satisfying because of structural complexities, excessive cost, and absence of modular or unit construction necessary for convenient, practical and economical installation with minimum alteration of existing cabinet structure in kitchens or the like.

More precisely, the present invention seeks to provide a simplified, efficient and comparatively economical unitized storage conveyor apparatus for easy installation bodily in existing or new kitchen or other type cabinetry to greatly increase the storage capacity and the accessibility of stored articles in such cabinetry, and to utilize corner regions of the cabinetry which are not ordinarily used conveniently or efficiently. Additionally, the invention can utilize adjacent wasted spaces above stairways or beneath floors on which the kitchen or other type cabinets are situated.

The storage conveyor mechanism utilized in the invention is reliable, durable and smooth and quiet in operation. It utilizes to the maximum the normally inconvenient corner spaces in kitchen cabinets and, in this connection, is far more efficient and convenient than the well-known vertical axis Lazy-Susan devices sometimes installed in cabinet corners. Much cabinet space is lost in the use of the traditional Lazy-Susan and such space is fully utilized by the invention.

An important aspect of the invention resides in a very simplified, motor-driven sprocket gear drive for the storage conveyor chains which are in staggered or offset relationship within a box-like housing which encloses the entire conveyor system and renders it a self-contained module or unit. Two driving sprocket gears engage the exteriors of the offset or staggered conveyor chains in a unique manner and the chains themselves are structured with large links and large rollers to cooperate with the external sprocket gear drive for greater efficiency and greater economy in manufacturing and installation, compared to traditional internal sprocket drives. The unique driving arrangement enables the use of an improved trackway system for the conveyor chains including arcuate trackway portions at opposite ends of straight trackway sections, whereby gaps are avoided in the continuous trackway and the large chain mounted wheels are positively guided at all points.

The storage conveyor module additionally embodies an improved storage tray construction and suspension system which assures that the conveyor trays are level at all times. The conveyor chain links, the trays and their suspension members are dimensioned so that the conveyor mechanism can be expanded readily for the addition of trays in buildings where ceiling heights may vary, thus rendering the invention easily adaptable to different installation requirements, including industrial installations where the housings of the storage conveyor modules may be of skeletal steel construction, may be of substantial height to make use of wasted overhead space in high ceiling warehouses, and the like, and where many such conveyor modules can be placed in side-by-side relation for storage of industrial parts.

Other features and advantages of the invention will become apparent during the course of the following description; by reference to the accompanying drawings, in which:

FIG. 1 is a fragmentary vertical section taken through cabinets and adjacent flooring and showing the modular storage conveyor installed in accordance with one preferred embodiment of the invention.

FIG. 2 is a fragmentary vertical section through the cabinet taken at right angles to FIG. 1 and showing the modular storage conveyor in front elevation.

FIG. 3 is a vertical section through the corner region of kitchen cabinets between a kitchen floor and ceiling and showing the installed storage conveyor module in side elevation according to a second embodiment thereof.

FIG. 3A is a fragmentary horizontal section taken on line 3A—3A of FIG. 3.

FIG. 4 is a vertical cross section taken through kitchen cabinets at a corner portion thereof between the floor and ceiling and through an adjacent normally unused above stairway compartment with a right angular storage conveyor module therein according to another embodiment of the invention.

FIG. 4A is a horizontal section taken on line 4A—4A of FIG. 4.

FIG. 5 is an enlarged fragmentary side elevational view partly in cross section of the conveyor guidance and driving means as depicted in FIG. 1.

FIG. 6 is a vertical section taken on line 6—6 of FIG. 5.

FIG. 7 is a fragmentary horizontal section taken on line 7—7 of FIG. 5.

FIG. 8 is a fragmentary perspective view of a storage conveyor tray according to one preferred embodiment.

FIG. 9 is a fragmentary perspective view, partly in section, showing a modified form of tray.

FIG. 10 is an enlarged fragmentary edge elevational view of conveyor chain links, drive rollers and associated elements.

Referring to the drawings in detail and referring initially to FIGS. 1, 2, 5 and 6 wherein like numerals designate like parts, conventional kitchen cabinets are illustrated including elevated cabinet sections 15 immediately below the ceiling and lower cabinet sections 16 immediately above the kitchen floor 17 and topped by the customary horizontal working counter 18. One wall of the kitchen is indicated at 19 in FIG. 1 and the underlying basement wall 20 is also shown down to the basement floor 21.

The numeral 22 designates a preassembled modular storage conveyor apparatus in its entirety which is particularly constructed for ease of installation in existing or new kitchen cabinets with only minimum alteration of the latter, and for the purpose of greatly expanding the convenience, utility and storage capacity of the cabinets without appreciably changing their external appearance.

The storage conveyor module or unit 22 comprises a rectangular sturdy elongated box housing 23 preferably of wooden construction, but which may also be of open skeletal steel construction, and formed in the required dimensions to meet the needs of a particular installation and to substantially completely enclose and support the storage conveyor mechanism, to be described in detail, and forming the main subject matter of the invention. The provision of the unit housing 23 is an important feature of the invention as it enables the storage conveyor to be handled and installed in the cabinetry and adjacent building space as a unit, thus completely avoiding costly and impractical on-the-job assembling operations. For example, in the embodiment shown in FIGS. 1 and 2, after opening the bottom of the lower cabinet section 16 and the adjacent floor as at 24, the preassembled storage conveyor module 22 can be moved into place and stabilized in any conventional manner and is substantially ready for usage after the establishment of the necessary simple electrical connections, not shown. As shown in FIGS. 1 and 2, the bottom of the module housing 23 can rest on the basement floor 21. In industrial applications, the storage conveyor module 22 can be stabilized in any conventional manner in a free standing position on a warehouse floor and extending upwarding toward the ceiling to make efficient use of the wasted storage space in high ceilinged warehouses, and the like.

At a convenient level between the basement floor and ceiling, an access or conveyor loading door 25 is provided on one wall of the housing 23 and an unloading access door 26 is provided adjacent to the top of the storage conveyor on the cabinet section 16. The door 26 can be an existing cabinet door.

The storage conveyor mechanism within the housing 23 and the module 22 is unique and comprises a pair of laterally spaced parallel endless conveyor chains 27 and 28, such chains being disposed in separated vertical planes, FIG. 7, and being offset or staggered from front-to-back within the housing 23 with the forward run of the chain 28 located close to the housing front wall 29 and the rear run of the chain 27 located close to the housing rear wall 30. As observed from their sides, FIGS. 1 and 5, there is some overlapping of the rear vertical run of the chain 28 relative to the forward run of the chain 27.

The two chains are endless and are composed of a multiplicity of equal length comparatively long side-by-side pairs of rigis links 31, each chain link having an aperture 32 at its longitudinal center for a purpose to be described. Opposite ends of the pairs of links 31 making up the chains 27 and 28 are articulated by pins 33 which also form the axles of large diameter conveyor chain rollers 34 preferably formed on a tough plastics material for silent low friction operation with durability. Preferably, in practice, the chain links 31 are three inches long between the centers of the adjacent axle pins 33 and the chain rollers 34 are preferably one and one-fourth inches in diameter by approximately one-quarter inch in axial thickness. The chain link length is chosen in the apparatus to facilitate adding additional storage conveyor trays to fully utilize the available space in deeper basements, it being recognized that basement ceiling heights vary over a considerable range. The arrangement is such that predetermined numbers of links 31 can be added in the chains 27 and 28, such as seven links in each conveyor chain, to enable the addition of one extra storage tray to the conveyor. While dimensions are not critical and can be varied in the invention, key dimensions including chain link length, tray height and tray suspension bar length are pre-established to facilitate the addition or subtraction of trays to meet the needs of particular installations.

The parallel vertical runs of the offset endless chains 27 and 28 are guided in continuous extruded vertical tracks 35 of modified channel cross section, FIG. 7, opposite side walls of the track 35 being grooved for close guidance of the rollers 34 therealong. The tracks 35 are securely anchored to adjacent vertical walls of the housing 23 through flat mounting flanges 36 which are apertured at spaced points to receive screws 37, FIG. 5. The tracks 35, as best shown in FIG. 1, extend for the major portion of the vertical height of the module housing 23 but terminate short of its top and bottom.

At the tops and bottoms of the tracks 35, FIGS. 1 and 5, the endless chains are guided continuously on arcuate paths by half-round plates 38 secured by screws 39 to the side walls of housing 23. The arcuate edges of the plates 38 carry channel cross section tracks 40 fixed thereto which receive the rollers 34 and guide them between the exit end of one track 35 and the entrance end of the opposite side track for a particular chain 27 or 28. The arrangement eliminates all gaps in the trackway system and the chain rollers 34 are continuously guided on their paths. The construction is such that there is almost no possibility for misalignment, dragging or binding in the conveyor mechanism and a smooth silent and friction-free operation is assured with a very simple and relatively low cost conveyor structure.

The companion offset or staggered chains 27 and 28 support a plurality of identical equidistantly spaced article storage and transport trays 41 which are maintained level at all times. These trays can be constructed according to the details shown in FIGS. 8 or 9, optionally. The present drawings illustrate the trays 41 according to the construction in FIG. 9.

Referring to FIG. 8, each tray 41' comprises a tray body 42 formed of sheet metal or plastics and being trough-like and fully open at its top, with a relatively low front wall 43 and a higher back wall 44 for convenience of access to the front of the tray. The opposite end portions of the tray body 42 are secured in grooves 45 routed in the inner faces of a pair of tray side walls 46.

Alternatively, in FIG. 9, each tray 41 includes side walls 47 having forward and rear vertical grooves 48 and 49 formed in their inner faces and receiving vertical edge portions of front and rear walls 50 and 51 having unequal heights. The interior face of front wall 50 is horizontally grooved at 52 to receive the forward horizontal edge of a tray bottom wall 53 whose rear edge is suitably secured to the rear wall 51 by nailing or otherwise, and whose end edges are received in horizontal grooves 53' in the side walls 47.

As shown in the other drawing figures, each tray 41 is suspended from the two offset chains 27 and 28 at diagonally opposite forward and rear corners by a single pair of equal length suspension bars or links 54 whose lower ends lap the bottoms of the trays 41 as at 55, FIG. 6, with the links firmly secured to the bottoms and side walls of the trays by means of screws or the like. The tops of the diagonally opposite links 54 of each tray 41 are suspended from horizontal pins 56 which extend through the described apertures 32 in the pairs of chain links 31 and are thus supported by the chain links, FIGS. 5 and 10. The opposite sides of the trays 41 and their suspension links 54 lie immediately inwardly of the tracks 35 so as to occupy substantially all of the available lateral space in housing 23 with almost no wasted space, FIG. 2. Likewise, within the housing 23, FIG. 1, the fronts and backs of the trays 41 supported on offset chains 27 and 28 are in close proximity with each other and with a vertical wall therebetween (not shown) extending between the side walls of housing 23, as well as with the front and rear walls of housing 23 so that almost all of the front-to-back space in the housing is utilized.

A very simple and positive power drive means for the two chains 27 and 28 is provided inside of the housing 23 at the top thereof, FIGS. 1, 2 and 5. This means comprises a sturdy inverted-U mounting bracket 57 attached directly to the top wall 58 of the housing 23 and depending therefrom in the space immediately above the two chains and their supporting half-round plates 38. A conventional electric gear motor 59 is mounted on the upper web of mounting bracket 58 and includes a horizontal axis driving sprocket gear 60, FIG. 2, connected by a chain 61 with a driven sprocket gear 62 on a transverse horizontal shaft 63 within or on top of the housing 23 and journaled in bearings 64 on the mounting bracket 57. The ends of shaft 63 carry driving sprocket gears 65 which are arranged to engage and drive the exteriors of the chains 27 and 28 at their tops and without the employment of the customary internal sprocket gears for the two chains. One sprocket gear 65 engages each chain near the front-to-back center line of the housing 23, as illustrated. Each sprocket gear 65 has a multiplicity of teeth with intervening large arcuate recesses 66 to receive and drive the large rollers 34 of one conveyor chain. The teeth on each sprocket gear 65 are each divided into a pair of smaller teeth 67 between the recesses 66 and these smaller teeth 67 are positioned to straddle and clear the tray suspension pins 56 during movement of the chains. The driving arrangement is simple and direct, quiet and less expensive than convention chain drives. Available space in the housing 23 is utilized most efficiently.

A second embodiment of the invention is shown in FIGS. 3 and 3A, wherein a preassembled modular storage conveyor apparatus 69, similar to the apparatus 22, is located between the kitchen floor 70 and ceiling 71 and does not extend into the basement space. As shown in FIG. 3A, the apparatus 69 occupies the corner space in the kitchen cabinets which is generally not efficiently utilized. The cabinets include right angular upper cabinet sections 72 with the corner apparatus 69 disposed therebetween, and lower cabinet sections 73 topped by a horizontal counter 74 also in right angular portions.

As in the previous embodiment, the modular storage conveyor apparatus comprises an essentially closed vertically elongated rectangular cross section box housing 75, and this box housing contains basically the same storage conveyor mechanism including offset chains 76 and 77, suspended trays 41, overhead mounting bracket 57, drive shaft 63 and sprocket gears 65 described in the prior embodiment. These elements and their modes of operation require no further description for a proper understanding of the second embodiment. It is to be understood, as in all forms disclosed, that the elongated rectangular cross section box housing 75 may be of skeletal steel construction and free standing in a warehouse or the like for industrial storage application.

As shown in FIG. 3, the fronts of the trays 41 face away from the kitchen wall and toward one section of the counter 74. Immediately above the counter 74, a downwardly swinging access door 78 is hinged to the front wall 79 of housing 75 in covering relationship to an access opening 80 in the housing front wall.

In both embodiments of the invention thus far described, controls for the electric gear motor drive, not shown, are conventional and may be embodied in a simple push button control panel near the counter top 18 or 74 in ready reach of the user. The drive may be operated forwardly or in reverse to position any selected tray 41 and its adjacent to either the cross opening 80 in FIG. 3 or the corresponding opening 81 in FIG. 1 rearwardly of the cabinet door 26. It should now be readily apparent that the invention in either embodiment greatly magnifies the overall utility of the kitchen cabinets and greatly increases available storage space while enabling the housewife to quickly obtain specific items at an access station, rather than fumbling through a myriad of articles of a stationary shelf sometimes requiring the use of a ladder or chair with the attendant danger of injury. Convenience and efficiency are heightened by the invention.

All other parts not specifically mentioned in the embodiment of FIGS. 3 and 3A are identical in construction and operation to the corresponding parts shown and described in the initial embodiment.

FIGS. 4 and 4A show yet another embodiment of the invention where the installation of the storage conveyor apparatus 82 includes a vertical section, FIG. 4, extending between the kitchen floor 83 and ceiling 84 and an upper horizontal section projecting through a prepared opening 85 in one wall 86 and through a normally useless head space above a descending staircase 87 immediately behind the kitchen wall 86.

Again, as shown in FIG. 4A, the vertical section of the storage conveyor is at the corner of the cabinetry including upper cabinet units 88 and 89, a right angular counter top 90 and lower cabinet units. The apparatus proper has a unitary preassembled box housing 91 including a vertical portion 92 and an upper horizontal portion 93 occupying the aforementioned head space above the stairway 87.

As best shown in FIG. 4, the storage conveyor apparatus, as with the prior embodiments, is housed bodily within the box housing 91 and includes two laterally spaced and offset endless conveyor chains 94 and 95 of the identical chain link and roller construction previously described in connection with the first embodiment. The identical conveyor trays 41 or 41' are utilized in the embodiment of FIGS. 4 and 4A. A convenient access door 96 is provided in the vertical section 92 of housing 91 above the surface of counter 90. In this vertical section of the apparatus, the forward low fronts of the trays 41 face away from the kitchen wall 86 as shown in FIG. 4. The vertical section of the storage conveyor in FIGS. 4 and 4A is arranged similarly to the conveyor apparatus in FIGS. 3 and 3A.

The horizontal section of the conveyor apparatus shown particularly in FIG. 4 requires a different guidance system for the two endless chains 94 and 95 in comparison to the previously-described embodiments having only vertically running chains. In FIG. 4, the chain 95 at the top of its vertical section passes around a quarter-round support and guide segment 97 having a channel track similar to the previously-described tracks 40. The chain 95 extends horizontally to the right in FIG. 4 beyond the quarter-round element 97 and then extends upwardly and around a half-circle support and guide track element 98, and then horizontally to the left and around another quarter-round support and guide element 99 from which the chain 95 extends downwardly through the vertical portion of the housing 91 and beneath and around a half-circle guide element 100 near the bottom of the housing, to complete its path.

The second chain 94 in FIG. 4 extends vertically upwardly from a lower half-circle guide element 101 and passes around a quarter-round element 102 at the elevation of the element 97 but in a different lateral plane. From the element 102, the chain 94 extends around a half-circle element 103 at the elevation of element 98 and then extends horizontally to the left and around a quarter-round guide element 104 and from this element, the chain 94 descends vertically to the half-circle element 101. Guide tracks previously described at 35 are connected both vertically and horizontally between the half-circle and quarter-round guide elements for both chains 94 and 95 to guidingly support them throughout the lengths of their circuitous routes.

The two chains 94 and 95, as in the other embodiments, are driven in unison by an electric gear motor means 105 held in a mounting bracket 106, dependingly secured to the top horizontal wall 107 of the preassembled box housing 91 which contains the modular apparatus. The gear motor 105 through suitable gearing 108 drives a pair of sprocket gears 109 in two lateral planes immediately above the planes of chains 94 and 95. The two sprocket gears 109 are constructed in the same manner as the sprocket gears 65 and engage the enlarged rollers 34 of the chains 94 and 95 to drive the two chains in unison. At their points of engagements by the sprocket gears 109, horizontal support extensions 110 of the quarter-round guide elements 99 and 104 extend beneath the two chains to lend support and guidance thereto. The details of construction of the chain driving means and of the chains per se remains unchanged in the several embodiments disclosed and described and such details were fully described initially in connection with FIGS. 5, 6 and 10.

It should be noted in connection with the optional tray 41, FIG. 8, that a pair of diagonally opposite support pins 111 are provided on each tray to be received in suitable apertures formed in the suspension bars 54 near their lower ends, in lieu of attaching the suspension bars to the trays 41 with screws or the like. Also, if the sides of the trays are made high enough at both the front and back, the tops of the sides can be pivotally connected directly to the respective chains at corresponding diagonally opposite locations.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

I claim:

1. A modular preassembled article storage and transport conveyor apparatus comprising a substantially rigid unitized support housing having at least one access opening in a side thereof, a pair of endless conveyor chains forming arcuate curved portions at opposite ends in offset relationship and disposed in laterally spaced parallel planes, each chain having multiple articulated links, plural spaced article storage and transport trays suspended at diagonally opposite corners in level relationship from said chains, said trays adapted to pass in succession adjacent to said at least one access opening of the housing, fixed guide track means for said chains on said housing and defining continuous substantially uninterrupted guidance paths for the endless chains along their entire movement paths, said fixed guide track means including arcuate support and guide portions for said arcuate curved portions of said chains and disposed interiorly of said chains, and power drive means for said chains on said housing including a pair of sprocket gears respectively in operative engagement with the exteriors of said pair of chains away from said arcuate support and guide portions and at a fixed point on the arcuate curved portion of each chain that face each other.

2. A modular preassembled article storage and transfer conveyor apparatus as defined in claim 1, and said pair of sprocket gears being laterally spaced and rotatable about a common lateral axis.

3. A modular preassembled article storage and transport conveyor apparatus comprising a substantially rigid unitized support housing having at least one access opening in a side thereof, a pair of endless conveyor chains in offset relationship and disposed in laterally spaced parallel planes, each chain having multiple pairs of side-by-side links of equal length articulated with adjacent pairs of links in said chain with enlarged rollers disposed between the pairs of links at the articulation points of said chain, plural spaced article storage and transport trays suspended at diagonally opposite corners in level relationship from said endless chains, at least the links of each pair in each chain from which the trays are suspended being apertured substantially midway between said enlarged rollers, suspension pins engaging through said chain link apertures, said trays adapted to pass in succession adjacent to said at least one access opening of the housing, fixed guide track means for said chains on said housing and defining continuous substantially uninterrupted guidance paths for the endless chains along their entire movement paths, power drive means for said chains on said housing including a pair of sprocket gears in operative engagement with the exteriors of said chains at a fixed point on each chain, and said sprocket gears having spaced teeth divided to form additional peripheral recesses in the sprocket gears adapted to engage over said suspension pins during the driving of said chains by said sprocket gears.

4. A modular preassembled article storage and transport conveyor apparatus as defined in claim 1, wherein said fixed guide track means comprises, guide track sections for straight portions of said chains within said housing on opposite side walls of the housing, arcuate support and guide portions for said chains at opposite ends of said guide track sections and disposed interiorly of said endless chains opposite from and in the same plane as said sprocket gears and defining with the guide track sections continuous uninterrupted trackways for the endless conveyor chains.

5. A modular preassembled article storage and transport conveyor apparatus as defined in claim 2, and said guide track sections comprising offset pairs of straight parallel channel cross section tracks supported on the interiors of opposite side walls of said housing, arcuate track sections of like cross sectional shape secured to the arcuate faces of said support and guide elements and forming with said straight tracks said continuous uninterrupted trackways, said enlarged rollers of said endless conveyor chains including multiple equidistantly spaced enlarged rollers projecting beyond opposite sides of links forming said chains, and said sprocket gears having intervening large arcuate recesses between said spaced teeth drivingly receiving said enlarged rollers.

6. A modular preassembled article storage and transport conveyor apparatus as set forth in claim 4, and said article storing and transport trays suspended from said endless chains being open top trays with trough-like bodies and parallel vertical end walls and the forward walls of the trough-like bodies being of substantially lesser height than the rear walls of said bodies to facilitate easy access to the trays from the forward sides thereof.

7. A modular preassembled article storage and transport conveyor apparatus as defined by claim 4, and suspension links for said trays at diagonally opposite corners thereof and being connected to the trays and extending above the trays and having their upper ends suspended from said suspension pins.

* * * * *